May 1, 1962 L. NAMENYI-KATZ 3,032,613

CASSETTES FOR MAGNETIC RECORDERS AND RECORDERS FOR USE WITH THESE

Filed Oct. 10, 1957

Inventor
L. Namenyi-Katz
By Glascock Downing & Seebold
Attys.

3,032,613
Patented May 1, 1962

3,032,613

CASSETTES FOR MAGNETIC RECORDERS AND RECORDERS FOR USE WITH THESE

Laszlo Namenyi-Katz, London, England, assignor to Epsylon Research & Development Company Limited, Feltham, England Filed Oct. 10, 1957, Ser. No. 689,439)
Claims priority, application Great Britain July 10, 1957
1 Claim. (Cl. 179—100.2)

The present invention consists of a removable cassette, for a magnetic recorder and reproducer comprising a container, a pair of rotatable spools mounted within the container and adapted to carry magnetic recording medium, at least one of said pair of spools being rotatable by means external to said container, and an electro-magnetic recording and reproducing head containing an iron circuit having a gap and carrying an electrical winding wherein said iron circuit is made in two separable parts, the one part containing said gap and being permanently fixed within said container, the other part carrying the electrical winding and being shaped to provide a low reluctance magnetic joint with said one part.

The invention is more especially adapted for use in connection with plastic thread coated or impregnated with magnetic material. Such filaments are not easily threaded through the small holes required in the magnetic heads. On the other hand two-part magnetic heads which can be opened for inserting the thread, not only require extraordinary precision in manufacture but are dependent on the complete absence of dust or fluff if they are to close perfectly. In the present invention this difficulty is overcome because the thread has to be threaded only once during the manufacture. Moreover as the cassette is completely enclosed it remains also dust free and does not allow the lubricant to escape.

The part within the container may then consist of two members of Permalloy or the like secured together with a spacing member of beryllium-copper or the like between the two members pierced by a hole running through both to receive the magnetic thread.

The other part is conveniently provided with two arms which are sprung outwards slightly when pushed on to the part within the container to form a low reluctance magnetic joint with the Permalloy members.

The invention will be further described with reference to the accompanying drawings.

Figure 1:
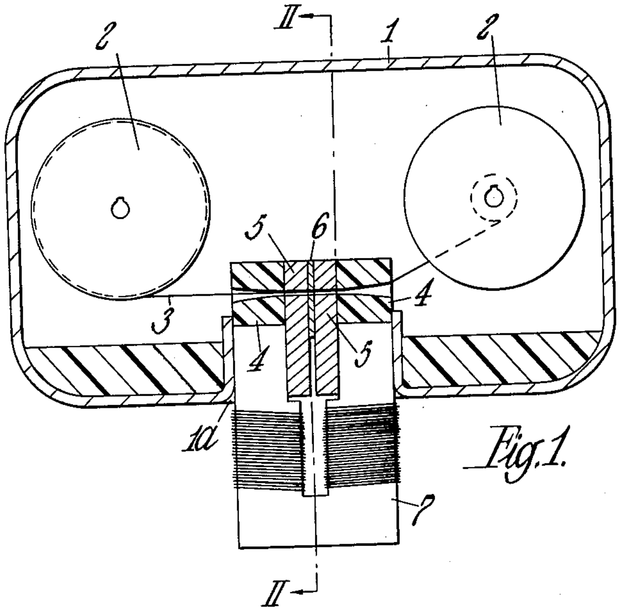
FIGURE 1 is a sectional view of a cassette according to the invention, showing also the separable part of the head adapted to engage therein.
Figure 2:
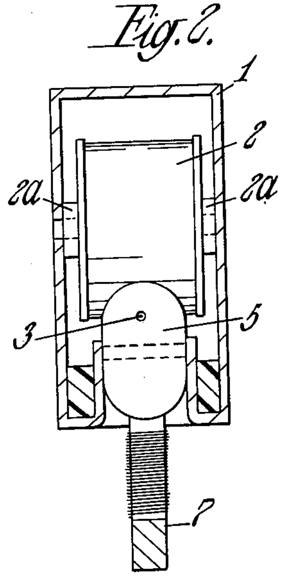
FIGURE 2 is a section on the line II—II of FIGURE 1.

The cassette 1, which may be sealed, embodies two spools 2 held in bearings 2*a* either of which spools may be driven by the insertion of an external driving shaft through an aperture in the cassette corresponding to the central aperture of the spool and arranged to key into the spool central aperture.

Thread 3 from one spool passes through an aperture in a guide piece 4 of funnelled form of a material with low friction such as polytetrafluorethylene or of a porous material impregnated therewith through the circular aperture of, say, 0.004″ diameter into the pole-pieces 5 of high permeable material such as known under the trade names of Permalloy, Mumetal, or Rhometal with spacer 6 therebetween and out through the corresponding guide-piece 4 on the other side to the other spool.

The guide and pole-piece assembly is secured within the cassette, e.g. by embedding in plastic, and apertures 1*a* are provided in the cassette to permit the insertion of the respective arms 7 of the separable part of the head, which carries the winding from the side (or from below) so that the arms 7 are slightly sprung outward and are thus spring pressed against the sides of Mumetal pole-pieces 5.

Lubrication by silicone lubricants can be provided within the cassette to ease the passage of thread 3.

The ends of the thread are solidly connected to the spools and the maximum pull imposed by the drive is only a fraction of the elastic limit of the thread, the drive in either direction is of the kind in which a tensional force beyond the desired maximum would allow the drive to slip. Such drives are commonly known as friction drives, fluid drives or magnetic eddy current slipping clutches etc. When the end of the thread is reached, the tension will be increased to its maximum, the force of which may be used to operate a trigger switch rendering the winding means inoperative. The two spools could, if desired, be on the same rotational axis.

Figure 3:
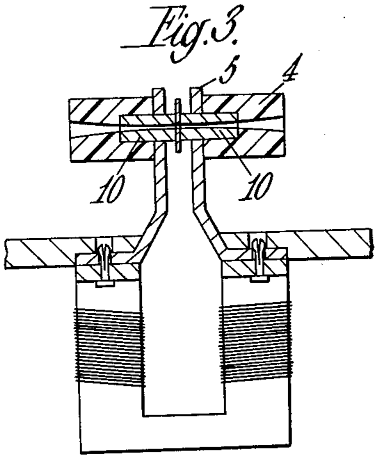
FIGURE 3 is a modification of the head specially adapted for the reproduction of low frequencies.

Permalloy and other high permeability materials are comparatively good conductors and the penetration depth of frequencies of the order of a few thousand kilocycles in these materials amounts to a few thousandths of an inch only. Consequently, the thickness of the pole-pieces 5 in FIGURE 1 should not exceed 0.008–0.012″. If, however, the head is to be adapted for reproducing low frequencies longer holes in the head may be indicated, as shown in FIGURE 3. The head is prolonged by two tubular parts 10 of small external diameter which are inserted into the laminae 5 and are themselves embodied into the guides 4. By keeping the external diameter of these tubes small it is ensured that eddy currents will not suppress the magnetic flux on its way from the ends of the magnetic circuit. It is not necessary to make these tubes 10 of very high permeability materials. It is more advantageous to have a permeability of the order of 2000 coupled with high electric resistivity, as in the metals known by the trade names of Rhometal and Radiometal. For very high frequencies as may arise in the recording and reproduction of video signals, these tubes, as well as the rest of the magnetic circuit, are preferably made of ferrites, that is to say, of magnetic insulating materials.

It will be understood that suitable traversing means for correctly guiding the thread on to the take-up spool could be provided. Also guide means may be provided for centralizing the thread through the aperture in the pole-pieces particularly in the case of recording when a larger diameter aperture and gap might be used to increase the flux penetration into the thread.

I claim:

Magnetic recording and reproducing apparatus comprising a cassette adapted to be mounted on said apparatus, two spools to carry a magnetic recording medium rotatably mounted in said cassette, at least one of said spools being adapted to be rotated by means external of said cassette, two magnetic members fixed to a wall of said cassette having a magnetic recording gap therebetween, each member projecting through said wall, the projecting portion of each member being formed with a flat surface, the surfaces being on opposite sides of the members and lying in planes which are parallel with each other and on either side of said gap, said gap being filled with non-magnetic material, said cassette with said magnetic members forming a container sealed against the entry of foreign matter, magnetic recording material carried on said spools permanently engaged with said magnetic members, and a third magnetic member carrying a winding mounted on said apparatus, the ends of said third magnetic member being formed with corresponding parallel surfaces, said cassette being mounted on said apparatus by sliding it into position in a direction parallel with said planes, whereby said members and said third magnetic member are brought into intimate magnetic contact.

References Cited in the file of this patent

UNITED STATES PATENTS

| | | |
|---|---|---|
| 902,773 | Stuart | Nov. 3, 1908 |
| 2,277,305 | Clopton | Mar. 24, 1942 |
| 2,441,679 | Wade | May 18, 1948 |
| 2,476,599 | Haloski | July 19, 1949 |
| 2,499,895 | Walker | Mar. 7, 1950 |
| 2,632,059 | Camras | Mar. 17, 1953 |
| 2,702,834 | Golle et al. | Feb. 22, 1955 |
| 2,804,508 | Mastling et al. | Aug. 27, 1957 |
| 2,831,180 | Hasbrouck | Apr. 15, 1958 |

FOREIGN PATENTS

| | | |
|---|---|---|
| 848,577 | Germany | Sept. 4, 1952 |
| 181,974 | Austria | May 10, 1955 |